United States Patent [19]

Poppe et al.

[11] Patent Number: 5,364,465
[45] Date of Patent: Nov. 15, 1994

[54] METHOD OF PRODUCING PROTEIN PRODUCTS FOR BRIGHT PAPER COATING APPLICATIONS

[75] Inventors: George Poppe; Denise Ciesielski, both of Decatur; Mark Matlock, Mt. Zion, all of Ill.

[73] Assignee: Archer Daniels Midland Company, Decatur, Ill.

[21] Appl. No.: 986,590

[22] Filed: Dec. 7, 1992

[51] Int. Cl.$^5$ ............................................. C08L 89/00
[52] U.S. Cl. ........................................ 106/124; 106/148; 106/154.1; 530/370; 530/407; 530/410
[58] Field of Search .................... 106/154.1, 124, 148; 530/407, 410, 370

[56] References Cited

U.S. PATENT DOCUMENTS

| | | | |
|---|---|---|---|
| 2,246,466 | 6/1941 | Julian et al. | 530/378 |
| 2,271,620 | 2/1942 | Brier et al. | 106/154.1 |
| 2,274,983 | 3/1942 | Hieronymus | 530/378 |
| 2,331,619 | 10/1943 | Morse | 106/154.1 |
| 2,356,795 | 8/1944 | Poarch | 106/154.1 |
| 2,385,240 | 9/1945 | Ware | 106/154.1 |
| 2,461,404 | 2/1949 | Wormell et al. | 106/154.1 |
| 2,524,991 | 10/1950 | Renner | 106/154.1 |
| 2,887,395 | 5/1959 | Rowe et al. | 106/154.1 |
| 4,035,194 | 7/1977 | Grassl | 106/154.1 |
| 4,036,996 | 7/1977 | Chandler et al. | 426/254 |
| 4,038,437 | 7/1977 | Chandler et al. | 426/656 |
| 4,073,948 | 2/1978 | Chandler et al. | 426/656 |
| 4,132,589 | 1/1979 | Christensen | 162/65 |
| 4,141,996 | 2/1979 | Chandler et al. | 426/44 |
| 4,264,493 | 4/1981 | Battista | 106/154.1 |
| 4,352,692 | 10/1982 | Krinski et al. | 106/614 |
| 4,626,319 | 12/1986 | Krüger et al. | 162/65 |
| 4,636,259 | 1/1987 | Hanaoka | 106/122 |
| 4,687,826 | 8/1987 | Seinmetz et al. | 106/154.1 |
| 4,808,262 | 2/1989 | Strop et al. | 426/417 |
| 4,859,283 | 8/1989 | Jayawant | 162/78 |
| 4,915,785 | 4/1990 | Siminoski et al. | 162/78 |
| 4,961,788 | 10/1990 | Krinski et al. | 106/154.1 |

*Primary Examiner*—Anthony Green
*Attorney, Agent, or Firm*—Laff, Whitesel, Conte & Saret

[57] ABSTRACT

A method of producing a modified vegetable protein binder for paper coatings having improved whiteness, brightness and strength wherein a vegetable protein material is oxidized with an oxidizing agent and a low level of magnesium compound.

23 Claims, No Drawings

METHOD OF PRODUCING PROTEIN PRODUCTS FOR BRIGHT PAPER COATING APPLICATIONS

FIELD OF THE INVENTION

This invention relates generally to a method of producing modified vegetable protein binders for paper coatings.

BACKGROUND OF THE INVENTION

For convenience of expression, the term "extract" is used herein to mean any soluble protein regardless of whether it might more appropriately be called an isolate or a liquor. Also, the term "chemical modification" is used herein to emcompass any treatment, such as hydrolysis, carboxylation, precipitation or additional separation, which occurs after the vegetable protein material is extracted and bleached.

Animal and vegetable proteins have been commercially used to make paper coating binders for many years. Casein, an animal protein, has historically played an important role in paper coatings. However, more recently, modified vegetable protein products, especially soy protein, have gained in commercial utilization. Today, modified soybean protein compositions are used as adhesive binders for piquant-containing coatings for paper and paperboard.

Clearly, it is desirable for paper coatings containing these soy protein and pigment compositions to have a bright white finish to contrast with printing inks. However, paper coatings prepared from these soy protein binders exhibit a reduced whiteness, as well as diminished gloss and brightness when compared with casein-containing coating binders.

Therefore, a bleach or oxidizing agent has sometimes been used to enhance the visual characteristics of the soy protein material. However, the process stage in which the soy protein material is treated with the bleach or oxidizing agent may vary depending upon the particular process being employed. For example, U.S. Pat. No. 2,246,466 discloses treating the alkaline extract of a protein with sodium peroxide. In contrast, U.S. Pat. No. 2,274,983 discloses the preparation of protein adhesives through hydrolysis followed by oxidation, wherein the preferred oxidizing agent is hydrogen peroxide. Furthermore, U.S. Pat. No. 4,961,788 discloses treating a carboxylated adhesive protein with an oxidizing material, such as hydrogen peroxide.

Problems arise, however, when the soy protein material is hydrolyzed or carboxylated before it is oxidized. This process allows color bodies to form before the bleach is applied. These color bodies must subsequently be destroyed by using substantial quantities of an oxidizing agent. These problems may be minimized by increasing the effectiveness of the oxidizing agent. However, these problems can be eliminated altogether and the visual characteristics of the final paper coatings can be enhanced if the soy protein material is oxidized with an effective oxidizing agent before any further chemical modification of the protein is performed.

Bleaching technology in the pulp and paper making industry uses peroxides in conjunction with various metal salts, such as magnesium salts. U.S. Pat. Nos. 4,132,589, 4,626,319, 4,859,283 and 4,915,785 disclose the bleaching of pulp through the use of peroxide and magnesium salts.

An object of the invention is to provide new and improved methods of producing modified vegetable protein binders for paper coatings.

SUMMARY OF THE INVENTION

This invention entails a method of producing a modified vegetable protein binder for paper coatings by oxidizing a vegetable protein material with an oxidizing agent and a low level of magnesium salt. Additionally, when an isolated vegetable protein material is oxidized with the oxidizing agent and magnesium salt combination before any further chemical modification, the formation of color bodies is prevented and the visual characteristics of the final paper coatings are further enhanced.

The addition of the low level of magnesium salt with the oxidizing agent surprisingly and effectively enhances oxidation, thereby improving the whiteness, brightness and strength of the final papers coatings. The present invention thus enhances oxidation, prevents the formation of color bodies, improves the visual characteristics of the paper coatings and is economically appealing.

DETAILED DESCRIPTION OF THE INVENTION

In the practice of the present invention, a vegetable protein material is extracted. Although various vegetable protein materials may be employed, soy protein is preferred for purposes of this invention.

Preferably, a soy protein extract is prepared by treating defatted soybean flakes with an alkaline solution to solubilize the protein and then separating the dissolved protein from the insoluble components by centrifugation or filtration. The extracted protein material may then be oxidized before any further chemical modification or it may be oxidized after being subjected to hydrolysis, carboxylation, precipitation or additional separation.

In a preferred embodiment of the invention, the extracted protein material is oxidized before any further chemical modification. The protein material is preferably oxidized using an oxidizing agent and a magnesium compound. A suitable bleaching combination of hydrogen peroxide, sodium peroxide, or ozone and magnesium hydroxide, magnesium sulfate, magnesium carbonate, magnesium oxide, magnesium acetate, or magnesium nitrate may be used. Hydrogen peroxide and magnesium hydroxide are preferred.

The magnesium compound is added to the extracted protein material under agitation. The magnesium compound should be present in the protein material at a level ranging from about 0.025% to 2.5% by weight of protein, and preferably, at a level of about 0.25% by weight of protein.

After the magnesium compound has been added, an oxidizing agent, preferably hydrogen peroxide, is added to the protein material. The peroxide should be added to the protein material at a level ranging from about 0.5 to 10% active peroxide by weight of protein, and preferably, at a level ranging from about 3.0 to 6.0% active hydrogen peroxide by weight of protein.

Oxidizing agents are normally available in different diluted strengths, such as 50%, 30%, etc. Therefore, the term "active oxidant" refers to only the active agent, or, stated otherwise, the equivalent amount of undiluted oxidant.

The oxidized protein material is then hydrolyzed under strongly alkaline conditions. A suitable alkali is added to produce a pH of 9.0 to 12.5 and the mixture is allowed to react for 15 to 150 minutes at a temperature of from 30° C. to 70° C. Preferably, sodium hydroxide is added to a pH of 10.5 to 11.8 and the reaction proceeds for 45 to 90 minutes at a temperature of 55° to 65° C.

The hydrolyzed protein material is next carboxylated to improve its adhesive properties as a binder in paper coatings. This improvement is achieved by adding a carboxylic acid anhydride to the hydrolyzed protein material. Some carboxylic acid anhydrides that may be utilized include phthalic, succinic, trimellitic and maleic anhydride. Phthalic anhydride is preferred. The carboxylic acid anhydride should be added to the protein material at a level in the range of about 2 to 10% by weight of protein, and preferably, in the range of about 5 to 8% by weight of protein. The pH at the time of addition of anhydride should be above 9.0, and preferably, between 10.0 and 11.0. The anhydride is allowed to react for 15 to 60 minutes at a temperature of 30° C. to 70° C., and preferably, it is allowed to react for 30 minutes at 60° C.

The modified protein material may be dried in one of two possible ways. The first method is to acidify the product with sulfur dioxide and/or sulfuric acid to a pH of about 4.3 to 7.0, then spray dry the mixture. The second method is to acidify the protein material with sulfur dioxide to a pH of about 7.0, then precipitate the protein with sulfuric acid at a pH of about 4.3. The precipitated protein is then separated from the soy whey by centrifugation. The soy protein curd is then dewatered by vacuum filtration, followed by oven or tunnel drying.

EXAMPLES

The following examples are intended to be illustrative of the present invention and to teach one of ordinary skill how to make and use the invention. These examples are not intended to limit the invention or its protection in any way.

The examples set forth below utilize various commercial ingredients, instruments and analytical procedures.

Union Carbide Y-12330 is a silicone dispersing agent and defoamer.

Kaolin #1 clay is a native aluminum silicate available as a special grade from J. M. Huber Corp. of Macon, Ga.

Draw-down rod size #22 is a ¼ inch diameter wet film applicator rod available from Paul N. Gardner Company, Inc. of Pompano Beach, Fla.

Coors funnel is a shaped porcelain funnel containing a perforated porcelain plate available from Fisher Scientific of Pittsburgh, Pa.

TAPPI (Technical Association of the Pulp and Paper Industry) analytical procedures are used to measure brightness and wax pick. TAPPI is located in Atlanta, Ga.

Hunter L.a.b. Whiteness paper tests are conducted using a Hunterlab D25-PC2 Colorimeter. The colorimeter is available from Hunter Associates Laboratory, Inc. of Reston, Va.

EXAMPLE 1

500 g of defatted soybean flakes were extracted at 120° F. for 30 minutes with 4000g of water under alkaline conditions. The pH was adjusted to a pH of 10 by using calcium hydroxide at the beginning of the extraction process. After 30 minutes, the solubilized protein material was separated from the insoluble material by centrifugation. The insoluble solids were then reextracted with 3000 g of water at 120° F. This second extraction slurry was also centrifuged and separated into an insoluble solid material and a second solubilized protein material. The two protein materials were combined and screened through a 325 mesh screen to yield 5670 grams of protein extract having 5.59% total solids, 3.35% protein, and a pH of 9.0.

As the temperature was increased to 65° C., 0.8 g of magnesium hydroxide and 32 g of 30% hydrogen peroxide were added to the protein extract. When the temperature reached 60°–65° C., 28.5g of 50% sodium hydroxide were added to yield a pH of about 10.6. Hydrolysis was allowed to occur under these conditions for 45 minutes. Then, 11.4 g of phthalic anhydride were added to the hydrolyzed protein material and allowed to react for 30 minutes. The carboxylated protein material was acidified with sulfur dioxide to a pH of 6.5 and further acidified with 50% sulfuric acid to a pH of 4.5 to complete the precipitation of the modified protein binder. Approximately 1.0 g of Union Carbide Y-12330 defoamer was added to the modified protein binder. The protein binder was then spray dried.

EXAMPLE 2

The dried modified protein binder of Example 1 was utilized in paper coatings prepared at 42 percent total solids at 100 parts by weight Kaolin (#1 clay), 14 parts protein, and 157 parts water. The coating was applied to the paper using a draw-down rod size #22. Coated paper samples were allowed to dry overnight at 72° F. and 50% relative humidity. G.E. Brightness (TAPPI T452 om-87) and Hunter L.a.b. Whiteness paper tests were then conducted at these same conditions. TAPPI 459 su-65 wax standards were also used to measure wax pick, i.e., a measure of the strength of the coating. The test results are illustrated below in Table 1.

TABLE 1

|  | Inventive Paper Coating (Example 2) | Conventional Paper Coating (Example 3) |
| --- | --- | --- |
| G.E. Brightness | 80.86 | 79.34 |
| Hunter L.a.b. Whiteness | 93.7 | 92.9 |
| Wax Pick | 4 | Heavy 4 |

EXAMPLE 3

The same procedure as described in Example 2 was followed, except that a conventional commercial protein binder was used in the paper coating preparation. A comparison of the visual characteristics and pick strength of paper coatings prepared from the inventive protein binder (Example 2) and from a conventional protein binder (Example 3) is shown above in Table 1.

As illustrated in Table 1 by the G.E. Brightness, Hunter L.a.b. Whiteness, and pick strength, the paper coating prepared from the inventive modified protein binder is superior to the paper coating prepared from a conventional protein binder in terms of whiteness, brightness and strength.

These coatings are used to cover gray paper stocks and the ability of these coatings to cover the darker colors underneath is of considerable commercial importance. The bright, white background is necessary to contrast with printing inks. A higher G.E. Brightness value indicates a coating that reflects light better. A higher Hunter L.a.b. value indicates a whiter surface. Strength of these coatings is important in their adhesion to the substrate to resist abrasion and delamination since many of these printed surfaces are used on exterior packaging. A higher wax pick value indicates a stronger coating adhesion to the paper. The pick value may also be rated by the amount of coating removed so a "heavy" value indicates more loss of coating.

EXAMPLE 4

4.0 kilograms of unmodified soy curd were obtained having dry solids of 10% and providing approximately 400 grams of protein solids. The pH was raised to 6.5 with a 50% sodium hydroxide solution. Then, 2.0 grams of Union Carbide Y-12330 defoamer, 1.0 gram of magnesium hydroxide and 40.0 grams of 30% hydrogen peroxide ($H_2O_2$) were added under agitation as the temperature was raised to 60° C. At this point, 68 grams of 50% sodium hydroxide were added to yield an initial pH of 11.5 and the hydrolysis was allowed to proceed under agitation at 60° C. for 90 minutes. At this time, 16 grams of phthalic anhydride were added and the mixture was allowed to stir for another 30 minutes at 60° C. At the end of the 30 minutes, heating was discontinued and sulfur dioxide gas was bubbled into the solution until the pH dropped to 6.5. The solution was then passed through a 325 mesh screen and spray dried to produce a dry modified protein binder product.

EXAMPLE 5

The modified protein binder of Example 4 was utilized in paper coatings prepared at 42 percent total solids at 100 parts by weight Kaolin (#1 clay), 14 parts protein, and 157 parts water. The coating was applied to the paper using a draw-down rod size #22. Coated paper samples were allowed to dry overnight at 72° F. and 50% relative humidity. G.E. Brightness and Hunter L.a.b. Whiteness paper tests were then conducted at these same conditions. TAPPI 459 su-65 wax standards were also used to measure wax pick, i.e., a measure of the strength of the coating. The test results are illustrated below in Table 2.

TABLE 2

|  | Inventive Paper Coating (Example 5) | No Magnesium Paper Coating (Example 7) | No Mg & $H_2O_2$ Paper Coating (Example 9) |
| --- | --- | --- | --- |
| G.E. Brightness | 80.48 | 80.06 | 79.54 |
| Hunter L. Whiteness | 94.0 | 93.9 | 93.62 |
| Wax Pick | 7 | 7 | 6 |
| K&N | 48.4 | 47.74 | 42.8 |

EXAMPLE 6

A protein binder was prepared according to the same procedure described in Example 4, except that the magnesium hydroxide was omitted in its manufacture.

EXAMPLE 7

The same procedure as described in Example 5 was followed, except that the protein binder from Example 6 was used in the paper coating preparation. A comparison of the visual characteristics and pick strength of paper coatings prepared from the inventive protein binder (Example 5) and from a similar protein binder containing hydrogen peroxide but not magnesium hydroxide (Example 7) is shown above in Table 2.

As illustrated in Table 2 by the G.E. Brightness, Hunter L.a.b. Whiteness, and pick strength, the paper coating prepared from the inventive modified protein binder is superior to the paper coating prepared from a protein binder without magnesium hydroxide in terms of whiteness and brightness.

As discussed previously, higher values for the G.E. Brightness and Hunter L.a.b. are important characteristics for commercial paper coatings. The K&N values are indicative of good ink receptivity or printability of the coating. The higher the value, the deeper the ink was able to penetrate and pigment the coating.

K&N is also used as a predictor of the coating's ability to accept a strong glue bond.

EXAMPLE 8

The same procedure as described in Example 4 was followed in preparation of a protein binder, except that hydrogen peroxide and magnesium hydroxide were omitted in its manufacture.

EXAMPLE 9

The same procedure as described in Example 5 was followed, except that the protein binder from Example 8 was used in the paper coating preparation. A comparison of the visual characteristics and pick strength of paper coatings prepared from the inventive protein binder (Example 5) and from a protein binder which does not contain hydrogen peroxide or magnesium hydroxide (Example 9) is shown above in Table 2.

As illustrated in Table 2 by the G.E. Brightness, Hunter L.a.b. Whiteness, and pick strength, the paper coating prepared from the inventive modified protein binder is superior to the paper coating prepared from a protein binder without hydrogen peroxide and magnesium hydroxide in terms of whiteness, brightness and strength.

EXAMPLE 10

9.45 kilograms of alkaline soy extract were obtained having a pH of 9.5, total dry solids of 7.07%, and providing approximately 400 grams of protein solids. 2.0 grams of Union Carbide Y-12330 defoamer, 1.62 grams of magnesium hydroxide and 65.0 grams of 30% hydrogen peroxide ($H_2O_2$) were added under agitation and the temperature was raised to 60° C. At this point, 83 grams of 50% sodium hydroxide was added to yield an initial pH of 11.5 and the hydrolysis was allowed to proceed under agitation at 60° C. for 90 minutes. At this time, 26 grams of phthalic anhydride was added and the mixture was allowed to stir for another 45 minutes at 60° C. At the end of 45 minutes, heating was discontinued and sulfur dioxide gas was bubbled into the solution until the pH dropped to 6.5. The solution was then passed through a 325 mesh screen. Sulfuric acid was added to a pH of 4.4 to precipitate the protein. The precipitated protein was then separated from the whey by centrifugation—yield=960g of curd. The protein curd was washed with 900 g of water and filtered under vacuum in a Coors funnel through nylon rip-stop cloth to form a filter cake. The protein cake was then pressed through small holes in a metal grill to form "noodles". These noodles were dried in an oven at 60° C. for about 4 hours. The dried noodles (6.7% moisture) were then ground into a powdered modified protein binder product—yield=191 g.

EXAMPLE 11

The modified protein binder of Example 10 was utilized in paper coatings prepared at 42 percent total solids at 100 parts by weight Kaolin (#1 clay), 14 parts protein, and 157 parts water. The coating was applied to the paper using a draw-down rod size #22. Coated paper samples were allowed to dry overnight at 72° F. and 50% relative humidity. G.E. Brightness and Hunter L.a.b. Whiteness paper tests were then conducted at these same conditions. TAPPI 459 su-65 wax standards were also used to measure wax pick, i.e., a measure of the strength of the coating. The test results are illustrated below in Table 3.

TABLE 3

|  | Inventive Paper Coating (Example 11) |
|---|---|
| G.E. Brightness | 79.56 |
| Hunter L.a.b. Whiteness | 93.62 |
| Wax Pick | 8 |

The process used to make the product described in Example 10, and used to make the coating described in Example 11 is a laboratory procedure that simulates a "tunnel-dried" commercial product starting from soy flakes. A product made in this fashion is usually much less expensive to produce than a "spray-dried" product. It also has the advantages of lower dusting as well as better water dispersability and better dry-flow properties. Cold water solubility of this particular oxidized product was also an unexpected benefit.

While the invention is described above in connection with preferred or illustrative embodiments, these embodiments are not intended to be exhaustive or limiting of the invention. Rather, the invention is intended to cover all alternatives, modifications and equivalents included within its spirit and scope, as defined by the appended claims.

What we claim is:

1. In a method of producing a modified vegetable protein binder for paper coatings comprising:
   providing a vegetable protein material extract; and
   bleaching the vegetable protein material extract with an oxidizing agent and a magnesium compound to provide a bleached vegetable protein material.

2. The method of claim 1 wherein said vegetable protein extract prior to bleaching has not been hydrolyzed nor carboxylated and further comprising the step of chemically modifying the bleached vegetable protein material by hydrolyzation, carboxylation and drying.

3. The method of either claim 1 or claim 2 in which the vegetable protein is soy protein.

4. The method of either claim 1 or claim 2 in which the oxidizing agent is taken from the group consisting of hydrogen peroxide, sodium peroxide, and ozone.

5. The method of claim 4 in which the oxidizing agent is hydrogen peroxide.

6. The method of either claim 1 or claim 2 in which the magnesium compound is taken from the group consisting of magnesium hydroxide, magnesium sulfate, magnesium carbonate, magnesium oxide, magnesium acetate, and magnesium nitrate.

7. The method of claim 6 in which the magnesium compound is magnesium hydroxide.

8. The method of either claim 1 or claim 2 in which the level of the oxidizing agent ranges from about 0.5 to 10% active oxidant by weight of protein.

9. The method of claim 8 in which the level of the oxidizing agent ranges from about 3.0 to 6.0% active oxidant by weight of protein.

10. The method of either claim 1 or claim 2 in which a level of magnesium compound ranges from about 0.025% to 2.5% by weight of protein.

11. The method of claim 10 in which the level of magnesium compound is about 0.25% by weight of protein.

12. A method of producing a modified vegetable protein binder for paper coatings having improved whiteness, brightness, and strength comprising the steps of:
   a. providing a vegetable protein material;
   b. bleaching the vegetable protein material with an oxidizing agent and a magnesium compound;
   c. hydrolyzing the bleached protein material;
   d. carboxylating the hydrolyzed protein material; and
   e. precipitating the modified vegetable protein binder.

13. The method of claim 12 in which the vegetable protein is soy protein.

14. The method of claim 12 in which the oxidizing agent is taken from the group consisting of hydrogen peroxide, sodium peroxide, and ozone.

15. The method of claim 14 in which the oxidizing agent is hydrogen peroxide.

16. The method of claim 14 in which the magnesium compound is taken from the group consisting of magnesium hydroxide, magnesium sulfate, magnesium carbonate, magnesium oxide, magnesium acetate, and magnesium nitrate.

17. The method of claim 16 in which the magnesium compound is magnesium hydroxide.

18. The method of claim 12 in which a level of oxidizing agent ranges from about 0.5 to 10% active oxidant by weight of protein.

19. The method of claim 18 in which the level of oxidizing agent ranges from about 3.0 to 6.0% active oxidant by weight of protein.

20. The method of claim 12 in which the level of magnesium compound ranges from about 0.025% to 2.5% by weight of protein.

21. The method of claim 20 in which the level of magnesium compound is about 0.25% by weight of protein.

22. The method of claim 2 comprising heating defatted soybean flakes under alkaline conditions with water and separating insoluble protein to provide a soybean protein extract, adding to said soybean extract a mixture of a first and a second compound to provide a bleached protein extract and wherein said second compound is selected from hydrogen peroxide, sodium peroxide and ozone and said first compound is selected from the group consisting of magnesium hydroxide, magnesium sulfate, magnesium carbonate, magnesium oxide, magnesium acetate and magnesium nitrate; hydrolyzing said bleached extract to provide hydrolyzed protein material;
   carboxylating said hydrolyzed protein material with phthalic anhydride to provide a carboxylated protein material; acidifying and precipitating the carboxylated protein material with sulfur dioxide and sulfuric acid to provide a modified protein binder; and drying said modified protein binder.

23. The method of claim 22 wherein said first compound is hydrogen peroxide and said second compound is magnesium hydroxide.

* * * * *